United States Patent [19]
Vischer, Jr.

[11] 3,733,998
[45] May 22, 1973

[54] PRESSURE COOKER

[75] Inventor: Alfred Vischer, Jr., Tucson, Ariz.

[73] Assignee: Vischer Products Company, Chicago, Ill.

[22] Filed: Apr. 6, 1971

[21] Appl. No.: 131,639

[52] U.S. Cl. ..................................... 99/330, 99/216
[51] Int. Cl. ................................................ A47j 27/14
[58] Field of Search ........................... 137/487.5, 557; 99/234 A, 325, 234 R, 249, 251, 270, 271, 280, 330, 344, 216; 21/56, 93, 94–98; 68/5; 126/20, 369, 374

[56] References Cited

UNITED STATES PATENTS

| | | | |
|---|---|---|---|
| 2,348,670 | 5/1944 | Woodward | 126/374 |
| 3,071,473 | 1/1963 | Churley | 126/20 X |
| 3,608,470 | 9/1971 | Zabiyakin et al. | 99/330 X |

Primary Examiner—Leon G. Machlin
Attorney—Lawrence B. Biebel, Nathaniel R. French, Dailey L. Bugg, Joseph G. Nauman, Gilbert N. Henderson, Mario A. Martella, Edward P. Forgrave and Thomas W. Flynn

[57] ABSTRACT

To control the pressure in a steam cooker, a switch arm of a pressure actuated switch is normally closed to a first contact that is in series with and energizes the coil of a normally-closed, solenoid-operated valve to permit steam to enter the steam cooker. The switch arm breaks with the first contact at 5 psi in the steam cooker and makes with a second contact that is in series with a single-throw, single-pole manually-operated switch and with the coil of the solenoid-operated valve to hold the valve open when the manually-operated switch is closed so that the pressure in the cooker is maintained at 15 psi, the pressure of the steam source, and to close the valve when the manually-operated switch is open so that the pressure in the cooker is maintained at 5 psi.

8 Claims, 2 Drawing Figures

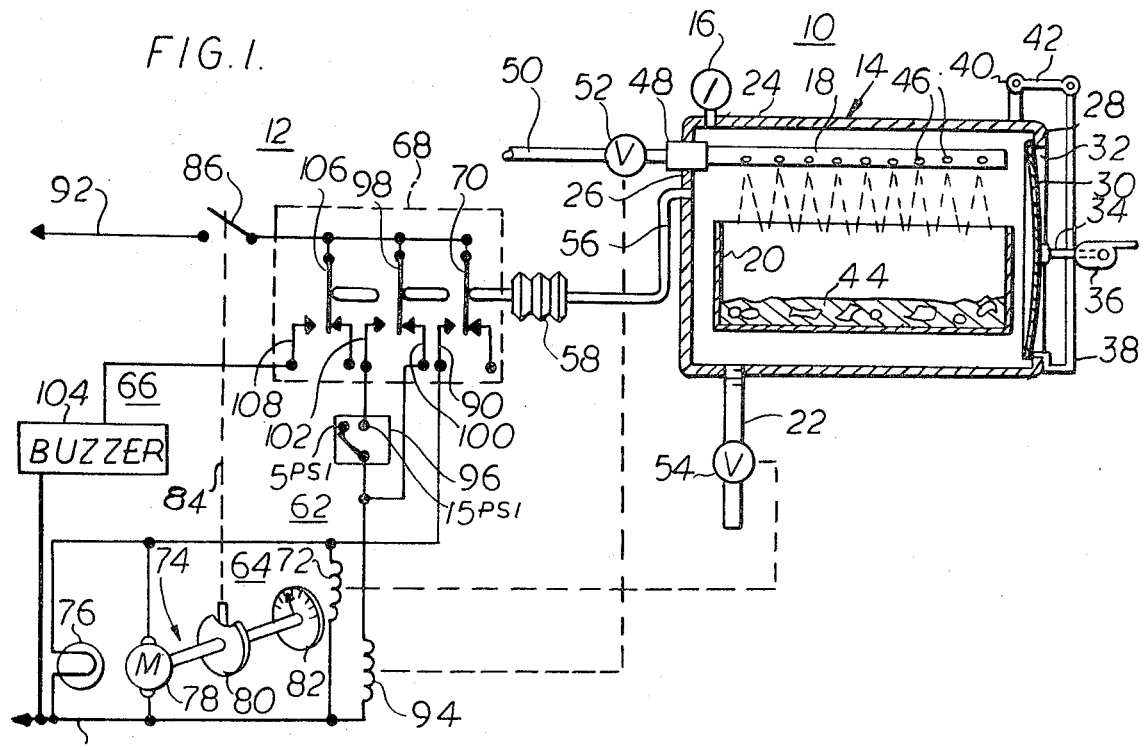
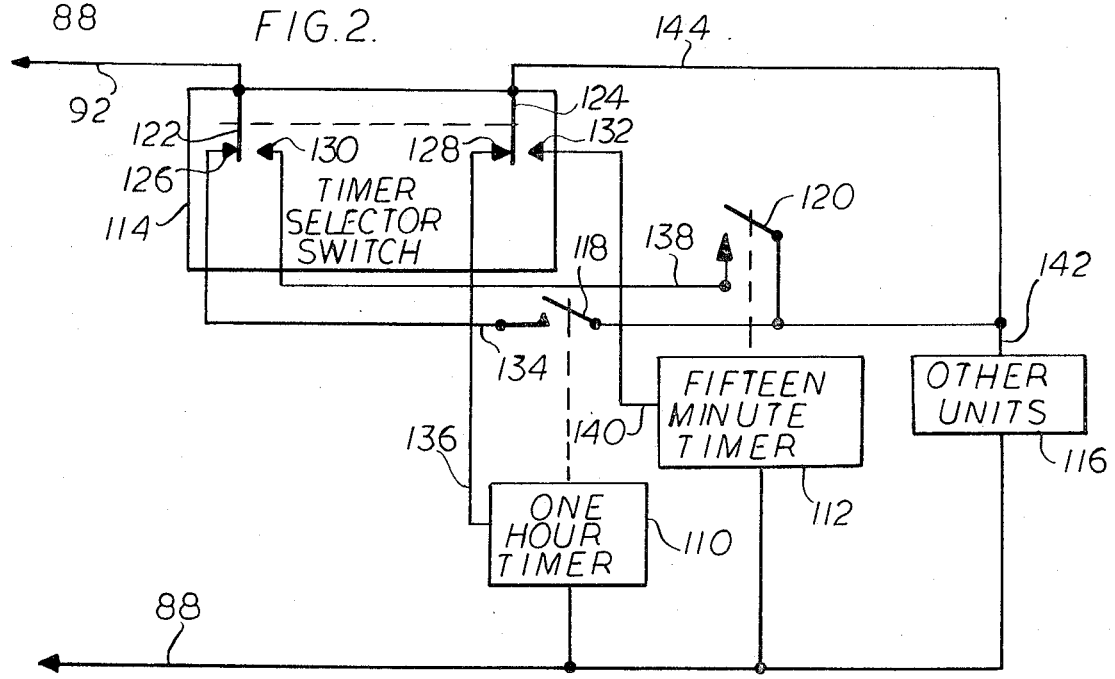

PRESSURE COOKER

This invention relates to steam cookers and more particularly relates to steam cookers that include a control unit for automatically controlling the cooking cycle.

The control unit for automatically controlled steam cookers includes a timer, a normally-closed solenoid-controlled inlet valve that opens and closes the steam inlet to the steam cooker and a normally-open solenoid-controlled drain valve that opens and closes the drain outlet from the steam cooker. At the start of a cooking cycle, the two solenoid-controlled valves are open so that steam enters the pressure cooker, increasing the temperature of the food until it is equal to the temperature of the steam and removing air from the pressure vessel through the drain outlet.

After the food has been brought to an elevated temperature, the steam stops condensing upon the food causing the pressure and temperature within the vessel to increase. When the pressure and temperature have reached a value of approximately 3 psi, the coil of the solenoid-controlled drain valve is energized to close the drain outlet and to permit the pressure within the steam vessel to increase to the level at which cooking is to be performed and the timer is started to control the cooking time. After a preset time set on the timer has elapsed, the timer deenergizes the solenoid-controlled inlet valve to disconnect the source of steam and deenergizes the solenoid-controlled drain valve to open the drain.

The prior art control units for pressure cookers maintain the steam pressure within the pressure cooker at the same fixed pressure to control the temperature during each cooking cycle. Control units for pressure cookers used to cook meat and cut vegetables or small vegetables maintain the pressure within the pressure cooker at 15 psi, which corresponds to 250 degrees Fahrenheit, and control units for pressure cookers that cook large solid pieces of food such as whole potatoes maintain the pressure at 5 psi, which corresponds to 225 degrees Fahrenheit, to prolong the cooking cycle and to permit the inside of large pieces of food to be adequately cooked.

The prior art control units have a disadvantage in that they cannot control the temperature and pressure of a steam cooker at any one of a plurality of different selected pressures and temperatures but only at one pressure and temperature such as at 5 psi and 225 degrees Fahrenheit or 15 psi and 250 degrees Fahrenheit. Because of this, a commercial pressure cooker controlled by such a unit is only used to cook either large pieces of food at 5 psi or small pieces of food at 15 psi. If both types of cooking are to be done, separate pressure cookers are necessary.

It is known to control the temperature in steam autoclaves used to process canned foods by means of a temperature control unit that is settable to more than one temperature. These temperature control units include a temperature sensing device that controls the amount of steam entering the autoclave but which is not sensitive to pressure. The pressure in these autoclaves is regulated by introducing compressed air into the autoclave in response to variations in pressure as measured by a pressure sensitive device.

The prior art control units for autoclaves used to process canned products have a disadvantage in that the temperature measuring devices are inaccurate and, if used in a pressure cooker, cause overcooking or undercooking of the food.

Accordingly, it is an object of this invention to provide a novel pressure cooker.

It is a further object of this invention to provide a novel control unit for controlling the cooking cycle of a pressure cooker.

It is a still further object of this invention to provide a novel control unit for pressure cookers, which control unit is capable of maintaining the steam pressure within the pressure cooker accurately at any one of a plurality of different selectable pressures.

It is a still further object of this invention to provide an improved pressure actuated switch for use in control units.

In accordance with the above and further objects of the invention, a steam pressure cooking apparatus is provided having a control unit and a pressure vessel with a steam inlet and a drain outlet.

The control unit includes two solenoid-controlled valves, a timer, a pressure selecting switch, and a pressure actuated switch. The first solenoid-controlled valve controls the steam inlet conduit and normally closes this conduit. The second solenoid-controlled valve controls the drain outlet conduit and normally opens this conduit. The pressure actuated switch includes an expandable pressure bellows communicating with the interior of the pressure vessel and a three-pole, double-throw switch, the first switch arm of which is moved by the expandable bellows at a relatively low pressure such as 3 psi within the pressure vessel and the second and third of which are moved at a higher pressure such as 5 psi within the pressure vessel.

The pressure selecting switch is a single-pole, single-throw switch connected in series with the normally open contact of the second switch arm of the pressure actuated switch and with the solenoid coil for the solenoid-controlled valve that controls the steam inlet. The same end of this solenoid coil is electrically connected to the normally closed contact of a second switch arm of the pressure actuated switch and the opposite end of the coil is connected to a source of electrical power to complete a circuit through the solenoid coil when the second switch arm is closed to its normally-closed contact or when the pressure selecting switch is closed and the second switch arm is closed to its normally open contact.

The three switch arms of the pressure controlled switch are each connected in parallel to a source of electrical power through the electrical contacts of the timer. The normally-open contact of the first switch arm of the pressure actuated switch is electrically connected to one end of the solenoid coil for the solenoid-controlled valve that controls the drain outlet of the pressure vessel and also to one end of the timer motor. The other end of the timer motor and the solenoid coil are connected back to the source of electrical power to form two circuits. A buzzer is connected between the normally-open contact of the third switch arm of the pressure actuated switch and a source of electrical power to form a third circuit.

In operation, a cooking cycle is started with the electrical contacts of the timer closed and with both solenoid-controlled valves open so that steam enters the pressure vessel driving air out through the drain and raising the temperature of the food to that of the steam. After the food has been heated, the pressure inside the vessel increases so that the bellows expands and causes the first switch arm to break with its normally closed contact and make with the opposite contact. This occurs at approximately 3 psi within the pressure vessel. When the first switch arm has made with its normally-open contact, the coil of the solenoid-controlled drain valve is energized, closing the drain and causing the pressure within the pressure vessel to increase rapidly. At the same time, the timer motor is energized causing it to begin timing a cycle of operation at the end of which it opens its electrical contacts.

When the pressure within the pressure vessel reaches 5 psi the bellows causes the second switch arm of the pressure actuated switch to break from its normally-closed contact and make with its normally-open contact.

If the manually-operated single-pole, single-throw switch has been thrown to the open position, which is the 5 psi position, the coil of the solenoid-controlled inlet valve is deenergized causing the inlet valve to disconnect the source of steam from the pressure vessel. If the pressure within the vessel falls to a lower level, the second switch arm of the pressure actuated switch again makes with its normally-closed contact and causes this solenoid-controlled inlet to open, permitting more steam to enter the vessel. With this mechanization, the cooking cycle proceeds at 5 psi until the timer opens its contact.

If the manually-operated single-pole, single-throw switch has been closed to the 15 psi side, the second switch arm of the pressure actuated switch continues to complete the circuit through the coil of the solenoid-controlled inlet valve and the pressure within the vessel is raised to the full pressure of the source of steam, which is normally approximately 15 psi. It continues at this pressure until the timer reaches its preset time at which time the timer contact opens.

The third switch arm of the pressure actuated switch breaks with its normally-closed contact and makes with its normally opened contact at approximately 5 psi, energizing the buzzer that is connected between this contact and the source of power. When this circuit is broken by the opening of the timer contact, this buzzer operates until manually reset, providing an audible alarm that indicates the end of the cooking cycle.

The invention in the above noted and other features thereof will be better understood from the following detailed description when considered in connection with the accompanying drawings in which:

FIG. 1 is a schematic diagram of steam pressure cooking apparatus that includes an embodiment of the invention; and FIG. 2 is a schematic circuit diagram illustrating another embodiment of a portion of the apparatus of FIG. 1.

STRUCTURE OF THE COOKING APPARATUS

In FIG. 1, a schematic diagram of steam pressure cooking apparatus is shown having an autoclave 10 and a control unit 12. The autoclave 10 includes a pressure vessel 14, a pressure meter 16 extending outside of the pressure vessel 14 and communicating with its interior, a steam ejector pipe 18, an open top food container 20, and a drain conduit 22.

The pressure vessel 14 includes cylindrical side walls 24 closed at one end by a vertical end wall 26 and having at its other end an inwardly extending annular flange 28 into which the pressure door 30 fits.

The door 30 is of a flexible material and is bowed about a horizontal axis when unbiased so as to be insertable within the circular opening 32 defined by the inwardly extending flange 28 in the end wall of the pressure vessel 14. An operating stud 34 extends orthogonally from the face of the door 30 and pivotally supports a toggle handle 36 thereon. A pivotable arm 38 extends vertically across the opening 32 and is pivotably mounted to the bracket 40 by the pivot arm 42 at the top of the pressure vessel 14. The toggle handle 36 rests upon the pivot arm 38 to exert, when operated, a biasing force outwards on the door 30 causing it to close the opening 32. When steam pressure is exerted from the inside of the pressure vessel 14, the door 30 is biased against the opening 32 by this steam pressure and the toggle handle 36 need not be operated for the door to seal the opening 32.

To support food within the pressure vessel 14, the open top container 20 is mountable therein and contains food such as potatoes indicated at 44 at the bottom of the container 20.

To supply steam to the pressure vessel 14, the steam ejector pipe 18 extends within the pressure vessel 14 in the direction of its longitudinal axis within a central vertical plane above the open top of the container 20 and includes a plurality of steam ejector nozzles or apertures 46 therein to eject steam down upon the food 44 within the container 20 during the cooking operation. The steam ejector pipe 18 passes through the end wall 26 wherein it is sealingly supported by a bushing 48. A steam inlet pipe 50 is connected to the steam ejector pipe 18 outside of the pressure vessel 14 through a normally-closed solenoid-controlled inlet valve 52.

To permit air and moisture to be exhausted from the pressure vessel 14, the drain pipe 22 communicates with the interior of the pressure vessel 14 and extends downwardly therefrom, being closed by the normally-open solenoid-controlled drain valve 54.

To permit the pressure within the pressure vessel 14 to operate the control unit, a pressure conduit 56 communicates with the interior of the pressure vessel 14 through the end wall 26 and is connected to an expandable pressure bellows 58 within the control unit 12.

The control unit 12 includes a pressure control circuit 62, a cooking-time control circuit 64, and an alarm circuit 66. Each of these circuits is connected to a pressure actuated switch 68 that includes and is operated by the expandable pressure bellows 58 in response to pressure in the pressure vessel 14 which communicates with the interior of the pressure bellows 58 through the conduit 56. The solenoid-controlled drain valve 54 closing the drain conduit 22 is controlled by the cooking-time control circuit 64, and the solenoid-controlled inlet valve 52 that closes the steam ejector pipe 18 is controlled by the pressure control circuit 62 and the cooking-time control circuit 64. The pressure-actuated switch 68 is a three-pole, double-throw switch in which the switch arms are actuated in succession by the expansion of the expandable pressure bellows 58.

The cooking-time control circuit 64 includes the first switch arm 70 of the pressure-actuated switch 68, the coil 72 of the solenoid-controlled drain valve 54, a timer 74 and an indicating lamp 76. The timer 74 includes a motor 78, a cam 80 and an indicator 82 driven by the motor 78. A cam follower 84 cooperates with the cam 80 to open the timer contact 86.

To operate the cooking-time control circuit 64, the time for the cooking operation is set upon the dial of the timer and the actuating button is depressed, closing the contact 86. When the motor 78 is energized by the making of the switch arm 70 with the contact 90 at 3 psi, the timer runs for the set amount of time and then opens the contacts 86 to stop the cooking operation.

The indicator lamp 76, the motor 78, and the solenoid coil 72 are electrically in parallel with each other, each having one terminal electrically connected to a source of power through the conduit 88 and another terminal connected to the normally-open contact 90 for the switch arm 70 of the pressure-actuated switch 68. The switch arm 70 is electrically connected to the source of power so that, when it is actuated by the pressure bellows 58, a circuit is completed from the source of power through the conductor 92, through the timer contact 86, through the switch arm 70, through the normally-open contact 90 which is made with the switch arm 70 at this time, through each of the parallel units (the indicator lamp 76, the motor 78 and the solenoid coil 72) and through the conductor 88 back to the source of electrical power. With this circuit the indicator lamp 76, the motor 78, and the solenoid coil 72 are each de-energized by either the opening of the timer contact 86 or the breaking of the switch arm 70 from the normally-open contact 90 by contraction of the expandable pressure bellows 58.

The pressure-control circuit 62 includes the solenoid coil 94 for the solenoid-controlled inlet valve 52 that controls the steam from the steam inlet 50, a single-pole, single-throw manually-operated switch 96, a switch arm 98 in the pressure-actuated switch 68, the normally-closed contact 100 for the switch arm 98 and the normally-open contact 102 for the switch arm 98. One end of the solenoid coil 94 is connected to the conductor 88 and its other end is connected to the switch arm of the single-pole, single-throw manually-operated switch 96 and to the normally-closed contact 100 for the switch arm 98. The normally-open contact 102 for the switch arm 98 is electrically connected to the contact of the single-pole, single-throw switch 96. The switch arm 98 of the pressure actuated switch 68 is electrically connected to the conductor 92 through the timer contact 86.

The alarm circuit 66 includes a buzzer 104, the third switch arm 106 of the pressure-actuated switch 68, and the normally-opened contact 108 for the switch arm 106. The buzzer 104 has one terminal connected to the conductor 88 and the other terminal connected to the normally-opened contact 108 for the switch arm 106. The switch arm 106 is electrically connected to the conductor 92 through the timer contact 86.

The buzzer 104 is of a type that is set by the application of an electrical voltage and begins to buzz when the voltage is removed. The buzzing continues until the buzzer is manually reset. The voltage must be entirely removed for a short time interval after the buzzer has been set so that slight variations in voltage and short interruptions do not cause buzzing.

The pressure-actuated switch 68 is a three-pole, double-throw switch in which the switch arms are actuated by the expandable bellows 58 so that the first switch arm 70 breaks with its normally-closed contact and makes with contact 90 when the pressure inside the pressure vessel 14 reaches approximately 3 psi, the second switch arm 98 breaks with its contact 100 and makes with the contact 102 when the pressure within the pressure vessel 14 reaches approximately 5 psi and the switch arm 106 breaks with its normally-closed contact and makes with the contact 108 when the pressure within the pressure vessel 14 reaches 5 psi. The pressure at which the respective switch arms are actuated is adjustable and the values given hereinabove are for use in the preferred embodiment.

The single-pole, single-throw manual switch 96 can be opened so that it is at the 5 psi position or closed so that it is at the 15 psi position.

When the manual switch 96 is open, a circuit is completed from the source of electrical power through the conductor 92, through the timer contact 86, the switch arm 98, the normally-closed contact 100, the solenoid coil 94 and the conductor 88 back to the source of electrical power. This circuit is completed when the timer contact 86 is closed and the pressure in the pressure vessel 14 is lower than 5 psi and, when closed, the inlet valve 52 is open to cause steam to enter the pressure vessel 14. If the manual switch 96 is open and the pressure rises above 5 psi, the circuit is broken to de-energize the solenoid coil 94 and close the valve 52 which prevents further steam from entering. Of course, if the pressure in the vessel 14 again falls below 5 psi the valve 52 opens to admit more steam.

When the manual switch 96 is closed, an additional circuit is completed from the source of power through the conductor 92, through the timer contact 86, through the switch arm 98, through the normally-open contact 102, through the manually-operated switch 96, through the solenoid coil 94 and through the conductor 88 back to the source of electrical power. This circuit is closed when the timer contact 86 is closed and the pressure is above 5 psi and it energizes the solenoid coil 94 to hold the valve 52 open so that steam continues to enter the pressure chamber 14 until the pressure within the chamber is equal to that of the steam inlet, which is normally 15 psi.

A circuit is completed through the buzzer 104 from the source of electrical power through the conductor 92, through the timer contact 86, through the switch arm 106, through the normally-open contact 108, through the buzzer 104 and back to the power supply through the conductor 88. This circuit is closed when the timer switch is closed and the pressure is above 5 psi and it sets the buzzer 104 so that when the timer contact 86 is open at the end of a cooking cycle the buzzer buzzes until it is manually reset.

In FIG. 2, a schematic circuit diagram is shown, illustrating an embodiment of the invention in which two timers are connected in parallel in a circuit similar to that shown in FIG. 1 to provide greater control over the cooking time.

The embodiment shown in FIG. 2 includes a 1-hour timer 110, a 15-minute timer 112, and a timer selector switch 114. Each of the timers 110 and 112 are similar to the timer 74 shown in FIG. 1 and are settable in time, but the 1-hour timer has a scale equal to 60 minutes and the 15-minute timer has a scale equal to 15 minutes so that the 1-hour timer 110 provides a longer possible cooking cycle but less precision than the timer 112. The 1-hour timer 110 includes an electrical contact 118 and the 15-minute timer 112 includes an electrical contact 120. All of the other components shown in FIG. 1 forming a portion of the control circuit are indicated at 116 by the block labeled "Other Units" in FIG. 2.

To select one of the timers 110 and 112, the timer selector switch 114 includes a first switch arm 122 and a second switch arm 124. The switches 122 and 124 are thrown to the left against contacts 126 and 128 to select the 1-hour timer or are thrown to the right against contacts 130 and 132, respectively, to select a 15-minute timer as shown in FIG. 2.

When the switches 122 and 124 are thrown to the left, the source of electrical power on the conductor 92 is connected to the contact 118 of the 1-hour timer 110 through the switch arm 122, the contact 126 and the conductor 134 and to the motor of the 1-hour timer 110 through the switch arm 122, the contact 126, the conductor 134, the timer contact 118 (if closed), the conductor 144, the switch arm 124, the contact 128 and the conductor 136. Similarly, when the switches 122 and 124 are thrown to the right, the source of electrical power on the conductor 92 is connected to the contact 120 of the 15-minute timer 112 through the switch arm 122, the contact 130, and the conductor 138 and to the motor of the 15-minute timer 112 through the switch arm 122, the contact 130, the conductor 138, the timer contacts 120 (if closed), the conductor 144, the switch arm 124, the contact 132, and the conductor 140. The 1-hour timer contact 118 and the 15-minute timer contact 120 are each connected to one end of the other units 116 through the conductor 142. The other ends of the motors of the 1-hour timer 110 and the 15-minute timer 112 and the other end of each of the other units 116 is connected to a source of power through the conductor 88 to complete the circuits from the conductor 92.

The other units 116 include a pressure actuated switch such as 68 and the contacts of this switch complete some circuits and open others depending on the condition of operation of the switch.

OPERATION OF THE COOKING APPARATUS

In operation, the autoclave 10 can be used to cook meat and small vegetables at 15 psi or large vegetables at 5 psi.

Assume first that frozen meat is to be cooked in the autoclave 10. The frozen meat is inserted in the container 20 (FIG. 1) and the container is positioned in the pressure vessel 14 of the autoclave. The door 30 is inserted through the opening 32 and the pivot arm 38 is moved downward in place. The toggle handle 36 is then operated to pull the door 32 against the flanges 28 of the pressure vessel 14, sealing the pressure vessel.

Since meat is easily penetrated by the steam, a short cooking time at a high temperature and pressure is desired. For this reason, the 15 minute timer is selected and the switch arm of the manual switch 96 is thrown to the 15 psi side. The proper time for cooking, which is assumed for the purpose of explanation to be 10 minutes, is set on the dial of the 15 minute timer 112 and the switch arms 122 and 124 of the timer selector switch 114 are thrown to the right as shown in FIG. 2. The actuator button of the 15 minute timer 112 is then depressed to close the 15 minute timer contact 120.

As best shown in FIG. 1, the manual closing of the timer contact (shown as 86 in FIG. 1) closes a circuit from the source of power through the conductor 92, through the switch arm 98, through the normally closed contact 100, through the solenoid coil 94, through the conductor 88 and back to the source of power. This circuit energizes the coil 94 and opens the normally closed inlet valve 52 to permit steam to pass from the inlet 52 through the steam ejector pipe 18 and out of the nozzles 46 onto the meat 44 in the container 20. The jets of steam passing through the steam ejector nozzles 46 strike the meat in the vessel 20 heating its top surface. The jets of steam condense rapidly on the surface and the temperature of the food is raised rapidly. As the top layer of the food becomes heated, the jets of steam are no longer condensed by the top layer and penetrate into lower layers until the entire area of the food is at an elevated temperature.

During this operation the normally-open drain valve 54 maintains the drain 22 open so that the steam forces the air and the condensed vapor out of the drain conduit 22. As the temperature of the meat 20 is raised to a value near that of the steam, the pressure rises within the pressure vessel 14. At approximately 3 psi, the expandable bellows 58 moves the switch arm 70 so that it breaks with its normally closed contact and makes with contact 90. This completes a circuit from the source of power through the conductor 92, through the timer contact 86, through the switch arm 70, and through the three parallel circuits (the solenoid coil 72, the motor 78, and the indicator light 76) to the conductor 88 and from there to the source of power. These completed circuits cause the following three operations to commence, which are: (1) the coil of the solenoid-controlled drain valve 54 is energized to close this valve and to close the drain 22; (2) the timer motor 78 is started to begin timing the 10 minute interval; and (3) the red indicator lamp 76 is illuminated to indicate the start of the cooking cycle.

Once the solenoid-controlled valve 54 has closed, the pressure within the pressure vessel 14 increases rapidly. When the pressure reaches 5 psi, the expandable bellows 58 actuates the switch arms 98 and 106. Upon actuation, the switch arm 98 breaks with its normally closed contact 100 and makes with contact 102 and switch arm 106 breaks with its normally closed contact and makes with the contact 108.

The manually operated switch 96 has been closed to the 15 psi contact to provide for fast cooking of the meat. In this position, a circuit is completed through the switch arm 98 through the contact 102, through the manually operated switch 96, and through the solenoid coil 94 to substitute for the broken contact between the switch arm 98, the contact 100, and the solenoid coil 94. Through this new circuit, the coil of the inlet valve 52 continues to be energized and steam continues to enter the pressure vessel 14, increasing the pressure therein to 15 psi, which is the pressure in the inlet conduit 50. This pressure corresponds to 250° F and provides for fast cooking of the meat within the container 20.

The closing of the switch arm 106 against the contact 108 completes a circuit from the power supply, through the conductor 92, through the timer contact 86, through the switch arm 106, through the contact 108, and through the buzzer 104 to the conductor 88 and back to the power supply. This sets the buzzer 104 so that it is ready to buzz when the circuit is broken.

When 10 minutes have elapsed on the timer, the cam 80 moves the cam follower 84 to open the timer contact 86 breaking all of the aforementioned circuits. At this time, the circuit is broken from the power supply to the solenoid coils 94 and 72 and to the buzzer 104. This causes the solenoid-controlled drain valve 54 to open to permit the exhaust of steam and causes the solenoid-controlled inlet valve 52 to close to prevent further steam from entering the pressure vessel 14. Also, the buzzer 104 begins to buzz until it is manually stopped. The cooking cycle is now complete and the reduction of pressure within the pressure vessel 14 releases the door 30 that has been held against the flanges 28 so that it can be removed through the opening 32, permitting the food to be withdrawn.

Now assume that frozen whole potatoes are to be cooked. These potatoes are inserted into the container 20 and the container 20 is placed within the pressure vessel 14. The door 30 is then inserted through the aperture 32 and the pivot arm 38 is positioned over the door. The toggle handle 36 is then activated to pull the door 30 against the inner edges of the flange 28 to seal the pressure vessel.

Since potatoes are relatively large, a long heating cycle at a lower temperature is desireable to permit the insides of the potatoes to be cooked as well as the outside. To accomplish this, the switch arms 122 and 124 of the timer selector switch 114 are moved to the left and the manually operated switch 96 is open to the 5 psi position. The 1 hour timer contact 118 is closed by depressing actuator button to close a circuit from the source of power through the conductor 92, through the switch arm 122, through the contact 126, through the conductor 134, through the 1 hour timer contact 118, to the other units 116 through the conductor 142 and to the switch arm 124 through the conductor 144. The other end of the other units 116 is connected back to the source of power through the conductor 88 to be energized thereby. A circuit is also completed through the motor of the 1 hour timer 110 from the source of power through the conductor 88, through the conductor 136, through the contact 128, through the switch arm 124 and to the now energized conductor 144.

As best shown in FIG. 1, when the contact switch 86 of the timer 74 is closed, a circuit is formed from the source of power through the line 92, through the closed timer switch 86, through the switch arm 98, through the normally closed contact 100, through the solenoid coil 94, through the conductor 88 and back to the source of power. This circuit energizes the normally-closed solenoid-operated inlet valve 52 to open this valve and permit steam to pass through the steam ejector pipe 18 and the steam ejector nozzles 46 down onto the food 44 within the container 20.

As the steam jets impinge upon the frozen potatoes, the steam is condensed by the cold outer layer of the potatoes. As the temperature of the outer layer is increased, the steam penetrates further into the potatoes and is condensed. At the same time the steam is forcing the air out of the pressure vessel 19 through the drain 22 and the normally-open drain valve 54.

As the temperature of the potatoes is raised to a temperature approaching that of the steam, the pressure begins to increase within the pressure vessel 14. This causes the pressure-actuated expandable bellows 58 to expand and to actuate the switch arm 70 at 3 psi so that it breaks with its normally closed contact and makes with the contact 90. When the switch arm 70 is made with the contact 90, a circuit is formed from the source of power, through the conductor 92, through the closed timer switch 86, through the switch arm 70 through the contact 90, through the solenoid coil 72 to the conductor 88 and back to the source of power. This circuit energizes the normally open solenoid-controlled drain valve 54, causing this valve to close and to prevent steam from exiting through the drain valve 22.

Once the drain valve 54 is closed, the steam within the pressure vessel 14 increases rapidly until it reaches 5 psi. When the temperature reaches 5 psi the expandable bellows 58 moves the switch arm 98 so that it breaks from its normally closed contact 100 and makes with the contact 102. The contact 102 is connected in series with the open, manually-operated switch 96. Because the switch 96 is open, the circuit through the solenoid coil 94 is broken, de-energizing this coil and causing the normally closed inlet valve 52 to close and to block the steam from the steam ejector pipe 18.

If the pressure within the vessel 14 falls below 5 psi, the switch arm 98 is forced to make with the contact 100 to re-energize the circuit including the solenoid coil 94 and to open the solenoid-operated inlet valve 52 permitting steam to flow into the pressure vessel until the pressure of 5 psi is reached.

Whenever the pressure of 5 psi is reached the pressure expandable bellows 58 closes the switch arm 106 against the contact 108 to energize and set the buzzer 104 as explained hereinabove. With this mechanization the pressure within the pressure vessel 14 is maintained at 5 psi until the 45 minutes set on the timer 74 elapses. Once the time has elapsed the cam 80 forces the cam follower 84 to open the switch contact 86 breaking each of the circuits. As explained hereinabove, the opening of these three circuits causes three operations, which are: (1) the buzzer 104 gives an audible warning until manually reset; (2) the drain valve 54 opens permitting steam to leave the pressure vessel 14; and (3) the valve 52 closes, preventing steam from entering the pressure vessel 14. The door can then be opened because of the reduced pressure within the vessel 14.

It can be understood from this explanation that the control unit for the pressure cooker permits the pressure cooker to be used to prepare either food in large piece, requiring cooking at a relatively low temperature for a long time, or food in small pieces to be cooked rapidly at a high temperature. To accomplish this, it permits the steam cooker to be operated at a selected one of two different pressures. Moreover, the temperature is accurately controlled through the use of a pressure measuring instrument which is inherently more accurate than a temperature measuring instrument.

Although a specific embodiment of the invention has been described with some particularity, many modifications and variations in the embodiment are possible in the light of the above teachings. It is therefore to be understood that, within the scope of the appended claims, the invention may be practiced otherwise than as specifically described.

I claim:

1. In a steam autoclave including an inlet connected to a source of pressurized steam, a drain, pressure sensitive means communicating with the interior of said autoclave and responsive to pressure variations therein, a control circuit, timer means, and a timer switch for opening said control circuit a preselected interval after said timer is energized, the improvement comprising:

a. a normally closed valve in said inlet,
   b. means for opening said normally closed inlet valve, c. a normally open valve in said drain,
d. means for closing said normally open drain valve,
e. pressure sensitive switch means operated by said pressure sensitive means,
f. said pressure sensitive switch means including:
  i. a normally closed contact for energizing said inlet valve opening means when said timer switch is closed and said control circuit thereby completed,
  ii. a first normally open contact for energizing said drain valve closing means when pressure in said autoclave reaches a first value, and
  iii. a second normally open contact for deenergizing said inlet valve means when pressure in said autoclave reaches a second value in excess of said first value, to cause said inlet valve to close, and
g. a manual switch including a first, open position and a second position for completing said control circuit through said second normally open contact when said pressure in said autoclave reaches said second value to retain said inlet valve open at pressures in excess of said second value.

2. The apparatus of claim 1 wherein:
a. said pressure sensitive means is an expandable bellows communicating with said interior of said autoclave, and
b. said switch means includes at least one switch arm caused to break with one of said contacts and make with another at a predetermined amount of expansion of said bellows.

3. The apparatus of claim 2 wherein:
a. said manual switch is connected in series with one of said contacts.

4. A control unit for a steam autoclave comprising:
a. pressure sensitive means in communication with the interior of said autoclave and responsive to changes in pressure therein,
b. an inlet to said autoclave connected to a source of pressurized steam and including a normally closed, solenoid controlled inlet valve,
c. a drain from said autoclave including a normally open, solenoid controlled drain valve,
d. switch means including a first switch arm and first and second electrical contacts positioned for alternate engagement thereby,
e. said pressure sensitive means causing said first switch arm to break with said first contact and make with said second contact at a first predetermined pressure in said autoclave,
f. a manual switch including a manual switch arm and a third electrical contact engageable by said manual switch arm,
g. one of said first and second electrical contacts being electrically connected with said third electrical contact and the other of said first and second electrical contacts being electrically connected to said manual switch arm,
h. said first switch arm being adapted to be electrically connected to a source of potential, and
i. a solenoid coil of said inlet valve being connected between said first electrical contact and being adapted to be connected to a source of potential at a different level whereby a circuit is established through said solenoid coil and said electrical contacts.

5. The control unit of claim 4 further comprising:
a. a timer including an electrical switch having a fourth electrical contact and a fifth electrical contact:
b. one of said fourth and fifth electrical contacts being electrically connected to said first switch arm and the other of said electrical contacts being electrically connected to a source of potential;
c. said fourth and fifth electrical contacts being opened and closed by said timer;
d. a second timer having a different time scale than said first timer;
e. said second timer having sixth and seventh electrical contacts;
f. said sixth and seventh electrical contacts being opened and closed by said second timer;
g. a timer selector switch having third and fourth switch arms;
h. said timer selector switch having eighth, ninth, tenth and eleventh electrical contacts;
i. said eighth electrical contact being electrically connected to one of said fourth and fifth electrical contacts and said ninth electrical contact being electrically connected to one of said sixth and seventh electrical contacts, the other two of said fourth and fifth, sixth and seventh electrical contacts being electrically connected together, to said switch arm, and to said fourth switch arm;
j. said eighth electrical contact being electrically connected to one end of the armature of a motor within said first timer and said ninth electrical contact being electrically connected to an armature of the motor within said second timer;
k. said fourth and fifth switch arms of said timer selector switch making contact at respectively with said eighth and tenth electrical contacts when in one position and with said ninth and eleventh electrical contacts when in another position.

6. The control unit of claim 5 wherein:
a. said switch means includes a third switch arm and a sixth electrical contact;
b. said pressure sensitive means causing said third switch arm to make with said sixth contact at a second predetermined pressure in said autoclave in excess of said first predetermined pressure;
c. said third switch arm is electrically connected to said other of said fourth and fifth electrical contacts; and
d. said normally-open, solenoid-controlled valve includes a solenoid coil electrically connected between a source of potential and said sixth electrical contact, whereby said normally-open, solenoid-controlled valve closes the drain outlet from said autoclave when pressure therein reaches said second predetermined pressure.

7. The control unit of claim 6 wherein:
a. said first predetermined pressure is approximately 5 psi and said second predetermined pressure is approximately 3 psi.

8. The control unit of claim 6 wherein:
a. said sixth electrical contact is electrically connected to said first timer, whereby said first timer is actuated at said second predetermined pressure.

* * * * *